June 8, 1965

M. J. MITCHELL 3,187,490

ROW CROP ATTACHMENT FOR FORAGER

Filed June 26, 1963

INVENTOR.
MELVILLE J. MITCHELL
BY Wolfe, Hubbard,
Voit & Osann
ATTORNEYS.

June 8, 1965    M. J. MITCHELL    3,187,490
ROW CROP ATTACHMENT FOR FORAGER
Filed June 26, 1963    2 Sheets-Sheet 2

INVENTOR.
MELVILLE J. MITCHELL
BY
ATTORNEYS.

United States Patent Office 3,187,490
Patented June 8, 1965

3,187,490
ROW CROP ATTACHMENT FOR FORAGER
Melville J. Mitchell, Birmingham, Mich., assignor to Massey-Ferguson Inc., Detroit, Mich., a corporation of Maryland
Filed June 26, 1963, Ser. No. 290,741
8 Claims. (Cl. 56—16)

This invention relates generally to forage harvesters and concerns, more particularly, a row crop attachment for a flail type harvester.

The primary aim of the invention is to provide a novel attachment permitting the effective use of a flail type forage harvester with row crops, in addition to its normal use. More specifically, the attachment of the invention brings to row crop harvesting all of the advantages of a harvester of the kind shown in my copending application Serial No. 209,605, filed July 13, 1962, now Patent No. 3,165,875, issued January 19, 1965.

It is also an object of the invention to provide an attachment of the above kind that can be easily added, and removed, from a basic flail harvester. Associating the attachment with the harvester does not require the disassembly of any major components of the harvester, as was often the case with prior units.

A further object is to provide a simple and economical attachment as referred to above which operates efficiently without gathering chains or butt conveyors. In more detail, it is an object to provide an attachment of this character having an efficient combination of biased flipper plates cooperating with novel floating feed rolls.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
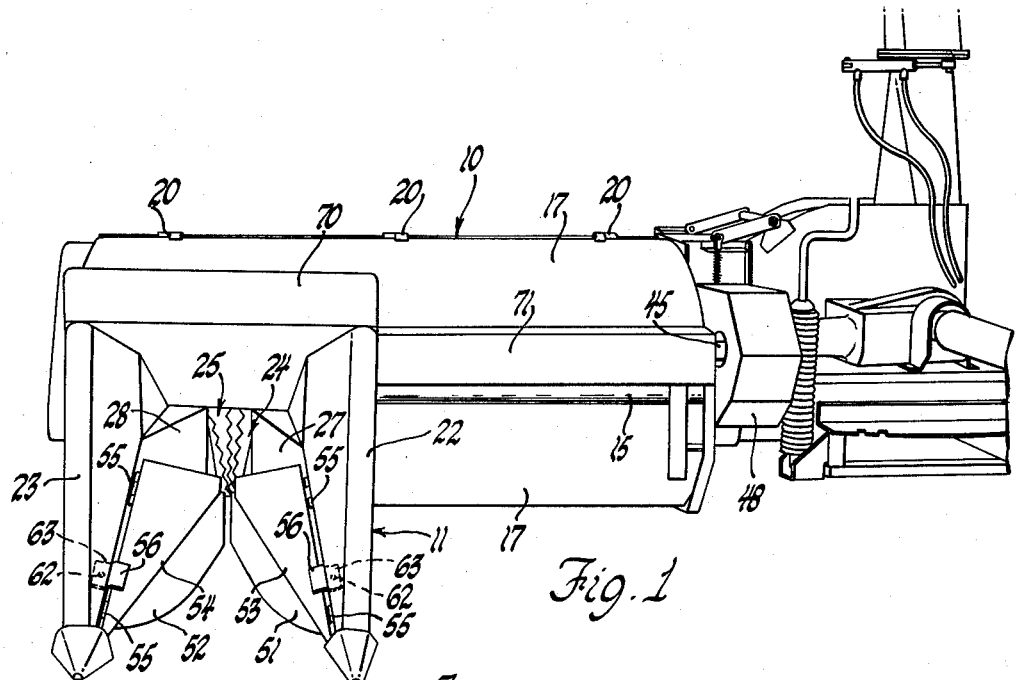
FIGURE 1 is a fragmentary perspective of a flail type forage harvester having mounted thereon an attachment embodying the present invention.

Turning first to FIG. 1, there is shown a flail type harvester 10 including a row crop attachment 11 embodying the present invention. The harvester is preferably of the kind shown in my copending application Serial No. 209,605 referred to above and reference may be had to this disclosure for details of the harvester's construction. For present purposes, it will be sufficient to note that the harvester 10 is of the flail type and includes a horizontally journalled flail 13 illustrated with its cutting arc in FIG. 3.

The attachment 11 includes a frame made up of a transverse tube 15 supporting a plurality of rib plates 16 to which is secured an arcuate housing element 17. The end rib plates 16 support laterally extending trunnion pins 18 that are received behind hook segments 19 of the harvester frame. The housing element 17 is pinned at a plurality of latches 20 to the harvester 10 so as to complete the rigid mounting of the attachment 11 on the harvester. When so positioned, the housing element 17 encloses the forward portion of the rotary flail 13.

Figure 2:
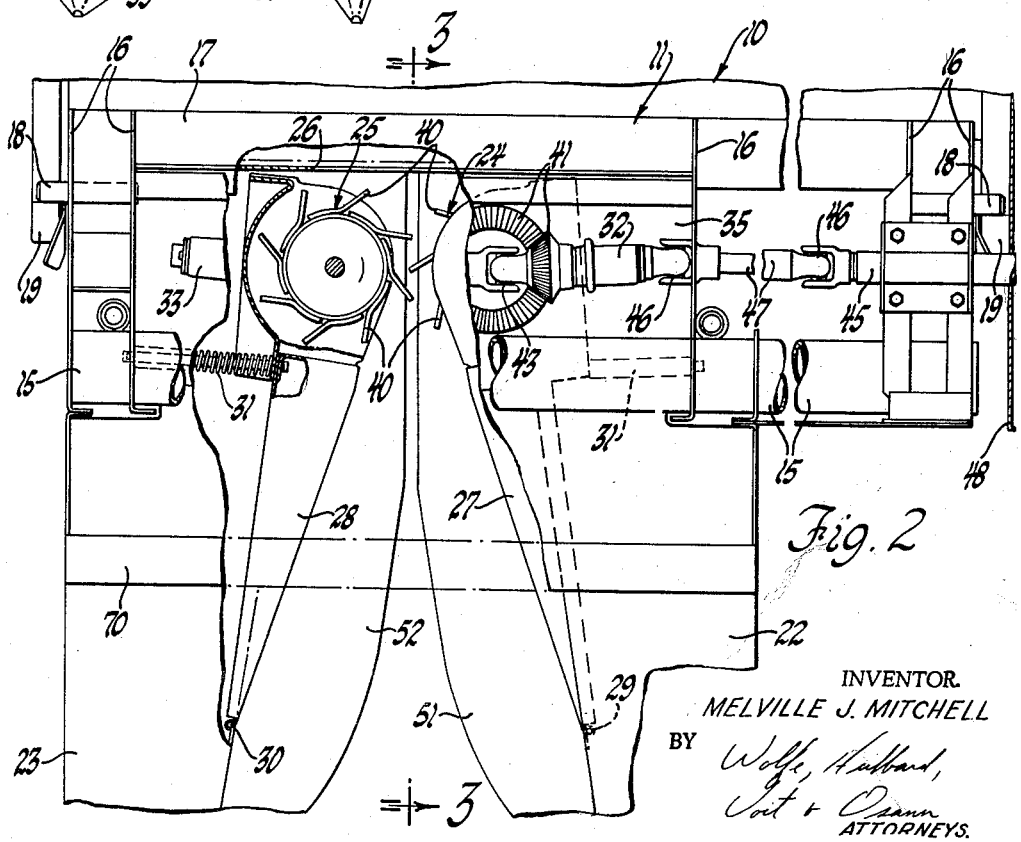
FIG. 2 is an enlarged fragmentary plan, with portions broken away, of the attachment shown in FIG. 1.

Pursuant to the invention, the attachment frame defines a laterally spaced pair of snouts 22 and 23, and a pair of feed rolls 24 and 25 are journalled in the attachment frame for rotation about generally vertical axes, the rolls being driven so as to feed crop material from between the snouts 22, 23 back and up into the flail 13 through an opening 26 in the housing element 17. In the preferred construction, a pair of structures 27 and 28 journal, respectively, the rolls 24, 25. The structures 27, 28 define generally vertical and opposed inner side walls for the snouts 22, 23 and are pivoted on the attachment frame by hinges 29 and 30 at their forward ends. The structures 27, 28 thus swing laterally and are biased by a plurality of springs 31 (see FIG. 2) so that the rolls 24, 25 are urged toward one another.

The upper ends of the rolls 24, 25 are journalled in brackets 32 and 33, respectively, secured to the respective structures 27, 28 so that the brackets extend upwardly through slots 34 in an inner floor plate 35. The ends of the slots 34 define the limits of the range of swinging movement of the structures 27, 28. The lower ends of the rolls 24, 25 rest on rollers 36 journalled in the attachment frame so as to support the weight of the rearward end of the structures 27, 28 without resisting rotation of the rolls or lateral swinging movement of the structures 27, 28.

As a feature of the invention, the rotatably driven rolls 24, 25 are formed to grip crop material and throw it up and back to the flail 13. To this end, the rolls include a plurality of angularly spaced fin plates 40 which are wound helically about the periphery of the rolls 24, 25. The outer edges of the fin plates 40 are serrated and the plates are preferably angled back from the direction of rotation (see particularly FIG. 2). In operation, the rolls grip the crop material channelled therebetween by the snouts 22, 23 and propel the material rearwardly into the flail 13. The helically wound disposition of the fin plates 40 also exerts an upward force so that the crop material tends to be drawn upwardly into the path of the flail. The biased structures 27, 28 allow the rolls to float apart and permit the passage of varying masses of crop material therebetween.

In keeping with the invention, the rolls are positively driven throughout their range of lateral swinging movement by gearing including universal joints connected by axially slidable shafts. The bracket 32 supports a pair of bevel gears 41 directly coupled to the roll 24, and the bracket 33 supports a second pair of bevel gears 42 directly connected to the roll 25. The bevel gears 41, 42 are directly coupled by a pair of universal joints 43 connected by square, interfitted axially slidable shafts 44 (see also FIG. 3). Power is derived from a drive shaft 45 coupled to the bevel gears 41 by a pair of universal joints 46 also connected by square, interfitted axially slidable shafts 47 (see FIG. 2). The drive shaft 45 is driven by a chain in a housing 48 extending from the main drive of the harvester 10. It can thus be seen that direct, positive drive for the rolls 24, 25 is obtained in all of the laterally shiftable positions of the structures 27, 28 through the axially slidable shafts 44, 47. The universal joints 43, 46 prevent binding of the shafts and insure free relative movement of the structures 27, 28.

As a further feature of the invention, pairs of plate-like flippers 51 and 52, and 53 and 54, are mounted on the attachment 11 in laterally spaced relation and are formed to define between them a throat leading to the feed rolls 24, 25. The flippers 51–54 are pivoted on hinges 55 at their outer edges and are biased upwardly against stops 56. The stops 56 are positioned so that the lower flippers 51, 52 assume a substantially horizontal position whereas the upper flippers 53, 54 assume an alined position wherein they are inclined back and up relative to the attachment 11.

Figure 3:
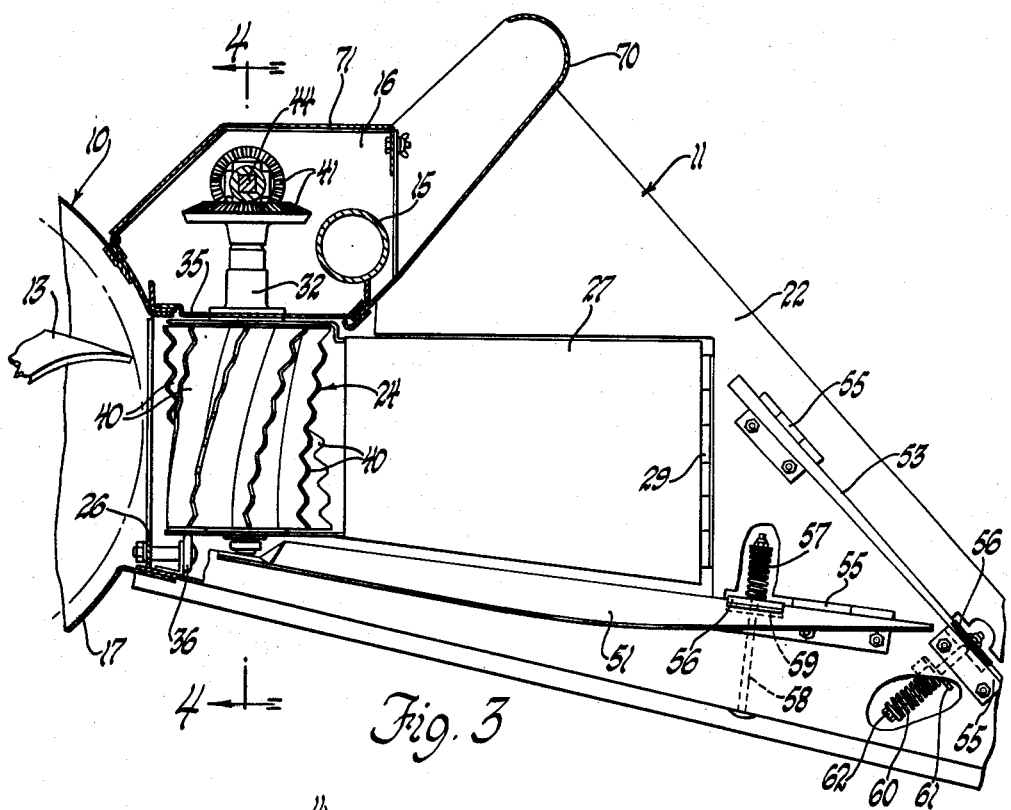
FIG. 3 is a fragmentary section taken approximately along the line 3—3 in FIG. 2.
Figure 4:
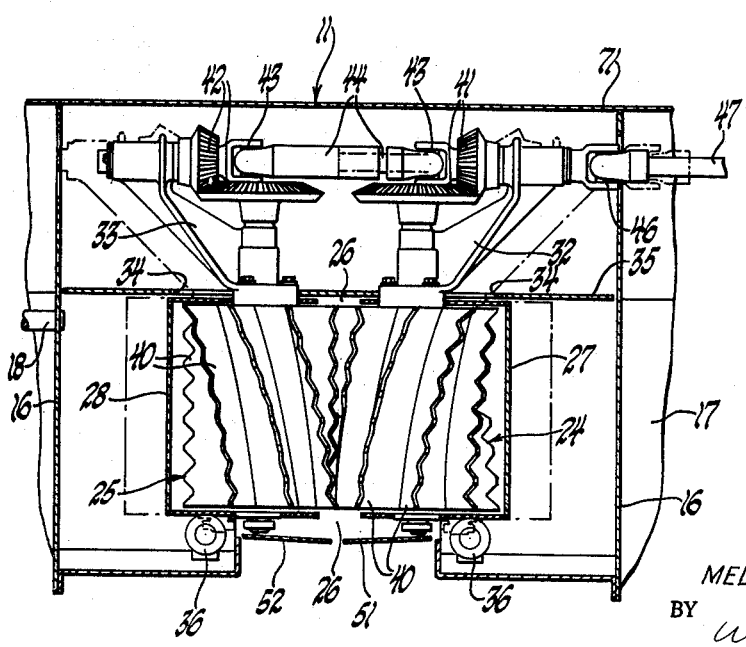
FIG. 4 is a fragmentary section taken approximately along the line 4—4 in FIG. 3.

To bias the lower flippers 51, 52, compressed helical springs 57 are anchored on pins 58 secured in the attachment frame and are positioned to bear on tabs 59 which extend in the opposite direction from the hinges 55 for the flippers 51, 52 (see particularly FIG. 3). To bias the upper flippers 53, 54, helical springs 60 are compressed between frame tabs 61 and the ends of pins 62 that are secured to lugs 63 that extend rearwardly from the hinges 55 relative to the flippers 53, 54 (see FIGS. 1 and 3).

In the preferred embodiment, a shield 70 extends up and forwardly of the attachment 11 so as to overlie the throat between the snouts 22, 23. Also, a cover 71 is hinged to the housing element 17 and releasably secured in overlying relation to the drive shaft 45 and the gearing associated with the bevel gears 41, 42.

Those skilled in the art will appreciate that the attachment 11 permits the effective use of the harvester 10 with row crops in addition to its normal functioning as described in the application identified above. The attachment 11 can be easily added to the harvester 10 without disassembly of any of the major portions of the harvester. It will further be appreciated that the attachment 11 is a particularly economical construction since it does not rely upon gathering chains or a butt conveyor for feeding the stalks of row crops into the harvester. The biased flippers 51–54 reliably guide row crops into the grip of the rolls 24, 25 and these rolls positively throw the crop material back and up into the flail 13. The resilient mounting of the flippers 51–54 and the floating mounting of the rolls 24, 25 permit reliable operation with widely varying densities of crop material. The lower flippers 51, 52 also serve to prevent ears of corn and similar portions of crop material from dropping free of the attachment and, hence, these lower flippers minimize crop loss.

I claim as my invention:

1. In a row crop harvester, the combination comprising, a pair of laterally movable structures, a pair of rolls journalled respectively on said structures for rotation about generally vertical axes, gearing including universal joints connected by axially slidable shafts coupling said pair of rolls for opposite rotation, and a power shaft coupled to said gearing through another set of universal joints connected by axially slidable shafts.

2. In a row crop harvester, the combination comprising, a pair of laterally movable structures, a pair of rolls journalled respectively on said structures for rotation about generally vertical axes, gearing including universal joints connected by axially slidable shafts coupling said pair of rolls for opposite rotation, means biasing said structures and thus said rolls toward one another, and a power shaft coupled to said gearing through another set of universal joints connected by axially slidable shafts.

3. In a row crop harvester, the combination comprising, a frame, a pair of laterally movable rolls journalled on said frame for rotation about generally vertical axes, a pair of flippers mounted on said frame in laterally spaced relation and formed to define between them a throat leading to said rolls, said flippers being pivoted at their respective outer edges, and means biasing said flippers into substantially a horizontal position.

4. In a row crop harvester, the combination comprising, a frame, a pair of laterally movable rolls journalled on said frame for rotation about generally vertical axes, a pair of flippers mounted on said frame in laterally spaced relation and formed to define between them a throat leading to said rolls, a second pair of flippers mounted on said frame in laterally spaced relation and formed to define between them a second throat leading to said rolls which overlies said first throat, said pairs of flippers being pivoted at their respective outer edges, and means biasing said flippers into substantially alined positions.

5. In a row crop harvester, the combination comprising, a frame defining a laterally spaced and forwardly extending pair of snouts, a pair of structures defining generally vertical and opposed side walls for said snouts, said structures being pivoted to said frame at their forward ends for swinging movement about generally vertical axes, a pair of feed rolls journalled respectively on the rear portions of said structures for rotation about generally vertical axes, and means for driving said rolls through the range of swinging movement of said structure.

6. In a row crop harvester, the combination comprising, a frame defining a laterally spaced and forwardly extending pair of snouts, a pair of structures defining generally vertical and opposed side walls for said snouts, said structures being pivoted to said frame at their forward ends for swinging movement about generally vertical axes, a pair of feed rolls journalled respectively on the rear portions of said structures for rotation about generally vertical axes, means biasing said structures and thus said rolls toward one another, and means for driving said rolls through the range of swinging movement of said structures.

7. In a row crop harvester, the combination comprising, a frame defining a laterally spaced and forwardly extending pair of snouts, a horizontally journalled flail mounted in said frame for receiving crop material from between said snouts, a pair of structures defining generally vertical and opposed side walls for said snouts, said structures being pivoted to said frame at their forward ends for swinging movement about generally vertical axes, a pair of feed rolls journalled respectively on the rear portions of said structures for rotation about generally vertical axes, means for driving said rolls to feed crop material into said flail through the range of swinging movement of said structures, a pair of flippers mounted on said frame in laterally spaced relation and formed to define between them a throat leading to said rolls, said flippers being pivoted at their respective outer edges, and means biasing said flippers into substantially a horizontal position.

8. In a row crop harvester, the combination comprising, a frame defining a laterally spaced and forwardly extending pair of snouts, a pair of structures defining generally vertical and opposed side walls for said snouts, said structures being pivoted to said frame at their forward ends for swinging movement about generally vertical axes, a pair of feed rolls journalled respectively on the rear portions of said structures for rotation about generally vertical axes, means biasing said structures and thus said rolls toward one another, gearing including universal joints connected by axially slidable shafts coupling said pair of rolls for opposite rotation, and a power shaft coupled to said gearing through another set of universal joints connected by axially slidable shafts.

References Cited by the Examiner

UNITED STATES PATENTS

| 515,031 | 2/94 | Turner | 56—29 |
| 1,581,558 | 4/26 | Wiggins | 56—503 |
| 2,657,513 | 11/53 | Martin | 56—16 |
| 2,803,101 | 8/57 | Lundell | 56—16 |
| 2,867,961 | 1/59 | Heilbrun | 56—119 |
| 2,972,848 | 2/61 | McKee | 56—16 |
| 3,088,263 | 5/63 | Thompson | 56—119 |
| 3,103,092 | 9/63 | Templeton | 56—44 |

T. GRAHAM CRAVER, *Primary Examiner.*

ANTONIO F. GUIDA, *Examiner.*